(12) United States Patent
Peri et al.

(10) Patent No.: US 12,070,908 B2
(45) Date of Patent: Aug. 27, 2024

(54) THREE-DIMENSIONAL OBJECT WITH A GLOSSY SURFACE, FORMULATIONS AND METHODS OF MANUFACTURING THE SAME

(71) Applicant: STRATASYS LTD., Rehovot (IL)

(72) Inventors: Dani Peri, Rehovot (IL); Cesar M. Manna, Rehovot (IL)

(73) Assignee: STRATASYS LTD., Rehovot (IL)

( * ) Notice: Subject to any disclaimer, the term of this patent is extended or adjusted under 35 U.S.C. 154(b) by 241 days.

(21) Appl. No.: 17/421,041

(22) PCT Filed: Jan. 7, 2020

(86) PCT No.: PCT/IL2020/050023
§ 371 (c)(1),
(2) Date: Jul. 7, 2021

(87) PCT Pub. No.: WO2020/144678
PCT Pub. Date: Jul. 16, 2020

(65) Prior Publication Data
US 2022/0055312 A1   Feb. 24, 2022

Related U.S. Application Data

(60) Provisional application No. 62/788,965, filed on Jan. 7, 2019.

(51) Int. Cl.
*B29C 64/40*      (2017.01)
*B29C 64/124*     (2017.01)
(Continued)

(52) U.S. Cl.
CPC ............ *B29C 64/40* (2017.08); *B29C 64/124* (2017.08); *B33Y 10/00* (2014.12); *B33Y 40/20* (2020.01); *B33Y 70/00* (2014.12)

(58) Field of Classification Search
CPC ..... B29C 64/40; B29C 64/124; B29C 64/112; B33Y 10/00; B33Y 40/20; B33Y 70/00
See application file for complete search history.

(56) References Cited

U.S. PATENT DOCUMENTS

2016/0355694 A1* 12/2016 Okamoto .............. B29C 64/129
2018/0265720 A1*  9/2018 Kitou .................... B33Y 70/00
(Continued)

FOREIGN PATENT DOCUMENTS

| EP | 2960718 | 12/2015 |
|---|---|---|
| WO | WO 2016/199131 | 12/2016 |
| WO | WO 2018/143303 | 8/2018 |

OTHER PUBLICATIONS

Partial International Search Report dated Jun. 2, 2020 for corresponding PCT Application No. PCT/IL2020/050023.
(Continued)

*Primary Examiner* — Timothy Kennedy
*Assistant Examiner* — Inja Song
(74) *Attorney, Agent, or Firm* — PEARL COHEN ZEDEK LATZER BARATZ LLP

(57) ABSTRACT

Methods, systems and formulations of building a three-dimensional object with a glossy surface, the method may include: selectively depositing a first material in a plurality of layers to form a body region of the three-dimensional object, wherein said first material comprises a multifunctional acrylic monomer; selectively depositing a second material in a plurality of layers to form a support region, wherein said second material comprises a monofunctional hydrophilic acrylic monomer and does not comprise a multifunctional acrylic monomer; curing each of the deposited layers, wherein in at least one of the deposited layers the first material and the second material mix to form an intermediate region at their mutual interface; dissolving the support region in an aqueous solution; and drying the body
(Continued)

region and the intermediate region, whereby the dried intermediate region provides a glossy surface on the body region of said three-dimensional object.

12 Claims, 5 Drawing Sheets

(51) Int. Cl.
*B33Y 10/00* (2015.01)
*B33Y 40/20* (2020.01)
*B33Y 70/00* (2020.01)

(56) References Cited

U.S. PATENT DOCUMENTS

2020/0010580 A1* 1/2020 Shimada .................. B29C 64/40
2020/0181303 A1* 6/2020 Xu ....................... C08F 220/282
2020/0282636 A1* 9/2020 Nishimoto ............ C08K 5/0041

OTHER PUBLICATIONS

International Search Report dated Jul. 24, 2020 for corresponding PCT Application No. PCT/IL2020/050023.

* cited by examiner

THREE-DIMENSIONAL OBJECT WITH A GLOSSY SURFACE, FORMULATIONS AND METHODS OF MANUFACTURING THE SAME

CROSS-REFERENCE TO RELATED APPLICATIONS

This application is a National Phase Application of PCT International Application No. PCT/IL2020/050023, International Filing Date Jan. 7, 2020, claiming the benefit of U.S. Patent Application No. 62/788,965, filed Jan. 7, 2019, which is hereby incorporated by reference.

TECHNICAL FIELD

The present invention relates to the field of fabrication of three-dimensional (3D) objects, and more particularly, but not exclusively, to a three-dimensional object with a glossy surface, formulations and methods of manufacturing the same.

BACKGROUND OF THE INVENTION

In almost any fabrication of a three-dimensional (3D) object, the surface quality of the finished object is of great importance from the point of view of both appearance and durability. Conventionally an object may be coated using for example coatings that are waterproof in order to prevent moisture from damaging the object. The coatings may be made from hydrophobic materials or materials that may completely seal and protect the object from moisture, and additionally improve the surface appearance of the object.

Known method for building or fabricating 3D objects include inkjet deposition of at least two different liquid materials in layers onto a printing surface or tray. One material may be the body material or "modeling material" for forming the 3D object and the other material, a support material for forming at least part of one or more supports or support constructions, for supporting during the fabrication process various parts of the object being built, including hollow spaces and overhangs in the designed object, thus enabling the formation of objects having a somewhat complicated geometry. The support constructions are preferably removed after the fabrication process is complete, to provide the final 3D object.

A common problem encountered when fabricating an object by inkjet printing of model and support materials is that when the two materials, in a liquid state, come into contact, a rough surface may be formed at the interface between them due to mixing of the model and support materials, resulting in a matte appearance of the affected surface after removal of the support portions, as well as a possible tendency to micro-scratches and other surface inconsistencies, thus negatively affecting both the external appearance and durability of the finished object.

According to WO 2016/199131, assigned to the present applicant, a method of obtaining an improved, glossy surface to the object using a 3D inkjet deposition method, involves leaving an air gap between the body and support portions during printing. An alternative method consists in depositing layers of each of the two portions with a delay between their respective depositions, so as to prevent contact and consequent mixing between the deposited materials when still in a liquid phase. Therefore, if not printed by forming a gap or a delay between the support and the body material, the 3D printed product may have to undergo a surface post-treatment or may be coated as aforesaid, in order to achieve a glossy surface appearance.

SUMMARY OF THE INVENTION

According to some embodiments of the present invention there is provided a method of building a three-dimensional object with a glossy surface, comprising: selectively depositing a first material in a plurality of layers to form a body region of the three-dimensional object, wherein said first material comprises a multifunctional acrylic monomer; selectively depositing a second material in a plurality of layers to form a support region, wherein said second material comprises a monofunctional hydrophilic acrylic monomer and does not comprise a multifunctional acrylic monomer; wherein in at least one of the deposited layers the first material and the second material mix to form an intermediate region at their mutual interface; curing each of the deposited layers; dissolving the support region in an aqueous solution: and drying the body region and the intermediate region, whereby the dried intermediate region provides a glossy surface on the body region of said three-dimensional object.

According to some embodiments of the present invention, curing is carried out by at least one of ultraviolet radiation, radiofrequency, chemical reaction and heat.

According to some embodiments of the present invention, the monofunctional hydrophilic acrylic monomer is selected from acrylamides.

According to some embodiments of the present invention, the monofunctional hydrophilic acrylic monomer is selected from N-Hydroxyethyl acrylamide and N-Isopropylacrylamide.

According to some embodiments of the present invention, the multifunctional acrylic monomer is selected from diacrylates, triacrylates and tetraacrylates.

According to some embodiments of the present invention, dissolving the support region is carried out in a water jacuzzi.

According to some embodiments of the present invention there is provided a three-dimensional printed object, comprising: a three-dimensional body comprising a model material; and a glossy surface present on at least a portion of the three-dimensional object.

According to some embodiments of the present invention, a region of the glossy surface comprises a hydrophilic acrylic polymer.

According to some embodiments of the present invention, the hydrophilic acrylic polymer comprises at least one of N-Hydroxyethyl acrylamide (HEAA) and N-Isopropylacrylamide (NIPAM).

According to some embodiments of the present invention, the model material of the body of the printed object comprises at least one of a diacrylate, triacrylate and tetraacrylate.

According to some embodiments of the present invention, there is provided a formulation usable in additive manufacturing of a three-dimensional object, the formulation comprising: a first hydrophilic monofunctional curable material; a second hydrophilic monofunctional curable material; and at least one water-miscible non-curable material, wherein a total amount of the curable materials is 90% or less, by weight, of the total weight of the formulation, and wherein a weight ratio of a total weight of said first hydrophilic monofunctional curable material and a total weight of said second hydrophilic monofunctional curable material ranges from 1:5 to 5:1.

According to some embodiments of the present invention, a total amount of the first hydrophilic monofunctional curable material ranges from 1 to 50, or from 10 to 40, or from 20 to 30, % by weight, of the total weight of the formulation.

According to some embodiments of the present invention, a total amount of the second hydrophilic monofunctional curable material ranges from 1 to 50, or from 10 to 40, or from 20 to 30, % by weight, of the total weight of the formulation.

According to some embodiments of the present invention, the at least one water-miscible non-curable material is in an amount of 1 to 90, or 10 to 80, or 20 to 60, or 30 to 50, % by weight, of the total weight of the formulation.

According to some embodiments of the present invention, the first hydrophilic monofunctional curable material is an acrylamide monomer or oligomer. According to some embodiments of the present invention, the acrylamide is an acrylamide comprising a tertiary amide moiety. According to some embodiments of the present invention, the acrylamide is N-Isopropylacrylamide (NIPAM).

According to some embodiments of the present invention, the second hydrophilic monofunctional curable material is an acrylamide monomer or oligomer. According to some embodiments of the present invention, the acrylamide is an acrylamide comprising a secondary amide moiety. According to some embodiments of the present invention, the acrylamide is N-Hydroxyethyl acrylamide (HEAA).

According to some embodiments of the present invention, the first hydrophilic monofunctional curable material and the second hydrophilic monofunctional curable material are acrylamides.

According to some embodiments of the present invention, the formulation comprises a first hydrophilic monofunctional curable material, in an amount of from 20 to 40, % by weight; a second hydrophilic monofunctional curable material in an amount of from 20 to 40, % by weight; and at least one water-miscible non-curable material in an amount of from 30 to 50, % by weight.

According to some embodiments of the present invention, the formulation is devoid of acryloyl morpholine (ACMO). According to some embodiments of the present invention, the formulation is devoid of a multifunctional curable material.

According to some embodiments of the present invention, featuring a viscosity of from 8 to 40 centipoises at 75° C.

According to some embodiments of the present invention, the additive manufacturing is 3D inkjet printing.

According to some embodiments of the present invention, the formulations features, when hardened, a material that is water soluble.

According to some embodiments of the present invention, each of said curable materials is a UV-curable material.

According to some embodiments of the present invention, the formulation further comprises a photoinitiator. According to some embodiments of the present invention, an amount of said photoinitiator is no more than 10% by weight of the total weight of the formulation.

According to some embodiments of the present invention, the formulation further comprises one or more additives. According to some embodiments of the present invention, the additive is selected from polymerization inhibitors, stabilizers, pigments, dyes, and surface-active agents, and any combination thereof.

According to some embodiments of the present invention, wherein the total amount of said one or more additives is no more than 3% by weight of the total weight of the formulation.

According to some embodiments of the present invention, wherein said at least one water-miscible non-curable material is selected from water, polyols, alkoxylated polyols, polyethylene glycols, polyvinylpyrrolidones, and any combination thereof.

According to some embodiments of the present invention, the weight ratio of a total weight of the first hydrophilic monofunctional curable material and a total weight of the second hydrophilic monofunctional curable material ranges from 1:2 to 2:1.

BRIEF DESCRIPTION OF THE DRAWINGS

The subject matter regarded as the invention, is particularly pointed out and distinctly claimed in the concluding portion of the specification. The invention, however, both to organization and method of operation, together with objects, features, and advantages thereof, may best be understood by reference to the following detailed description when read with the accompanying drawings in which:

Figure 1:
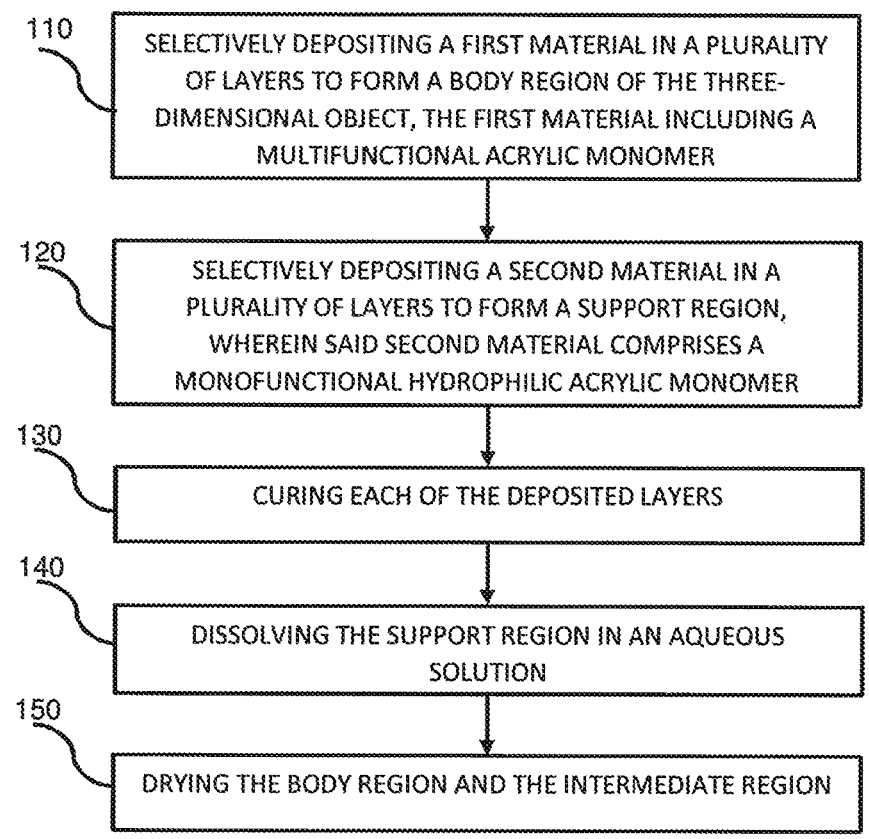
FIG. 1 is a flowchart of a method of building a three-dimensional object with a glossy surface according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Some aspects of the invention may be directed to a method of fabricating by three-dimensional inkjet printing, a 3D object having a glossy surface and a glossy 3D object fabricated by inkjet printing. The 3D object may be deposited layer by layer (e.g., by 3D inkjet printing) using materials that produce a glossy surface of the object after completion of the printing process.

When the inventors were working on developing a water-soluble material, as expected when depositing in experimentation modeling material (for building an object) and support material for supporting the 3D object together in the same layer or consecutive layers, an intermediate layer was formed by mixing of the modeling and support materials at the interface between them. However, contrary to all expectations, the inventors discovered when using certain combinations of materials, that the intermediate mixed-material layer instead of having a negative effect on the surface of the 3D object, actually has an unexpected advantageous effect on the external appearance of the 3D object.

The inventors surprisingly found that the support materials of the invention were both water soluble and left a glossy effect, i.e. created a glossy surface on the printed objects after they had dried.

Thus, in some embodiments, the support material may be water soluble (e.g., hydrophilic); therefore, the intermediate layer formed by the mixing of the support and modeling material may also be, at least to some extent, hydrophilic. In some embodiments, following completion of the deposition process, the support material may be removed, e.g. washed away using an aqueous solution, leaving the printed 3D object with a surface film or layer of remnant mixed-materials which swells due to exposure to the aqueous solution. In some embodiments, after the wet object dries, the mixed-material at the surface of the object may turn glossy, and thus a glossy 3D object may be fabricated, without additional post-processing and time-consuming actions to improve its appearance. In some embodiments, the glossy coating is to some extent hydrophilic.

Reference is made to FIG. 1, which is a method of building a three-dimensional object with a glossy surface according to some embodiments of the invention. In box 110, a first material may be selectively deposited in a plurality of layers to form a body region of the three-dimensional object. In some embodiments, the first material may include a multifunctional acrylic monomer. In some embodiments, the first material may include between 20%-50% multifunctional acrylic monomer, for example, between 30%-40% multifunctional acrylic monomers. For example, the first material may include multifunctional acrylic monomer that may be selected from a group consisting of: diacrylates, triacrylates and tetraacrylates. In some embodiments, the multifunctional acrylic monomers may also be used for crosslinking and hardening the body region, for example, following the application of ultraviolet (UV) radiation or other heating energy.

In Box 120, a second material may be deposited selectively in a plurality of layers to form a support region. In some embodiments, the second material may include a monofunctional hydrophilic acrylic monomer. In some embodiments, the second material is devoid of a multifunctional acrylic monomer. In some embodiments, the monofunctional hydrophilic acrylic monomer may be an acrylamide. For example, the monofunctional hydrophilic acrylic monomer may be selected from a group consisting of: N-Hydroxyethyl acrylamide and N-Isopropylacrylamide In some embodiments, the first material may further include D-sorbitol, distilled water, dolyvinyl pyrolidone (PVP), polyol, surfactant, photo-initiators and a polymerization initiator. In some embodiments, the second material may be water soluble.

Figure 3:
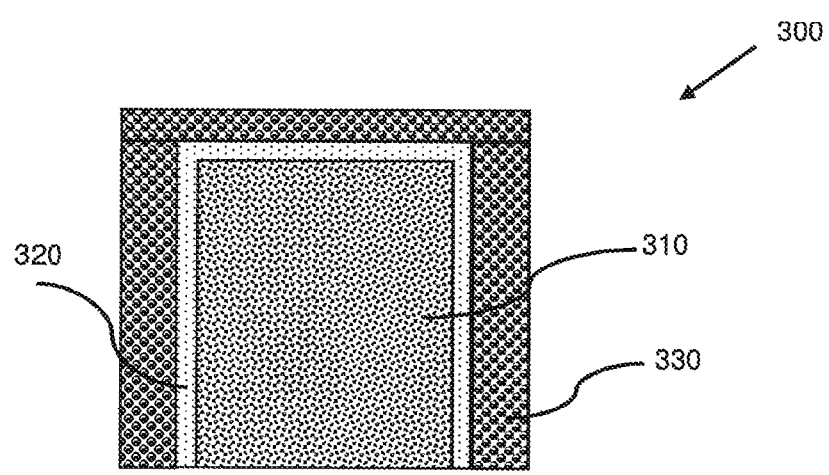
FIG. 3 is an illustration of a cross-section of a three-dimensional object being fabricated to have a glossy surface according to some embodiments of the invention.

In some embodiments, the first and second materials may be deposited based on instructions computed in a data processor. The instructions may include depositing the first and second materials based on 3D digital data, such that, at least some of the layers comprise both the body region to be printed by the first material and the support region to be printed by the second material. In some embodiments, in at least one of the deposited layers the first material and the second material may mix to form an intermediate region at their mutual interface, as illustrated in FIG. 3.

In box 130, each of the deposited layers may be hardened, e.g. cured, for example, using ultraviolet (UV) radiation or any other form, source or device for heating, curing and/or hardening. During the curing, cross-linking may occur between polymeric chains in all of the regions containing multifunctional acrylic monomer. Accordingly, cross-linking may occur in the body region and in the intermediate region. Therefore, these two regions may stabilize and harden.

In box 140, the support region may be removed, e.g. dissolved in an aqueous solution. The 3D object may be introduced to a tank containing the aqueous solution. The tank may include a stirring unit, for example, may include a water whirlpool or jacuzzi-like unit or a device that swirls water in the tank, to remove and/or otherwise remove the support region/s. The intermediate region or layer at the surface of the object, may swell due to exposure to the aqueous solution.

Figure 4A:
FIGS. 4A-4C are images of three-dimensional objects at various production stages according to some embodiments of the invention.
Figure 4B:
Figure 4C:

In box 150, the body region and the intermediate region may be dried, for example, in a drying cabinet or in the open air. Following the drying process, the dried intermediate region may provide a glossy appearance to the body region of the three-dimensional object, as illustrated in FIGS. 4A-4C.

Figure 2:
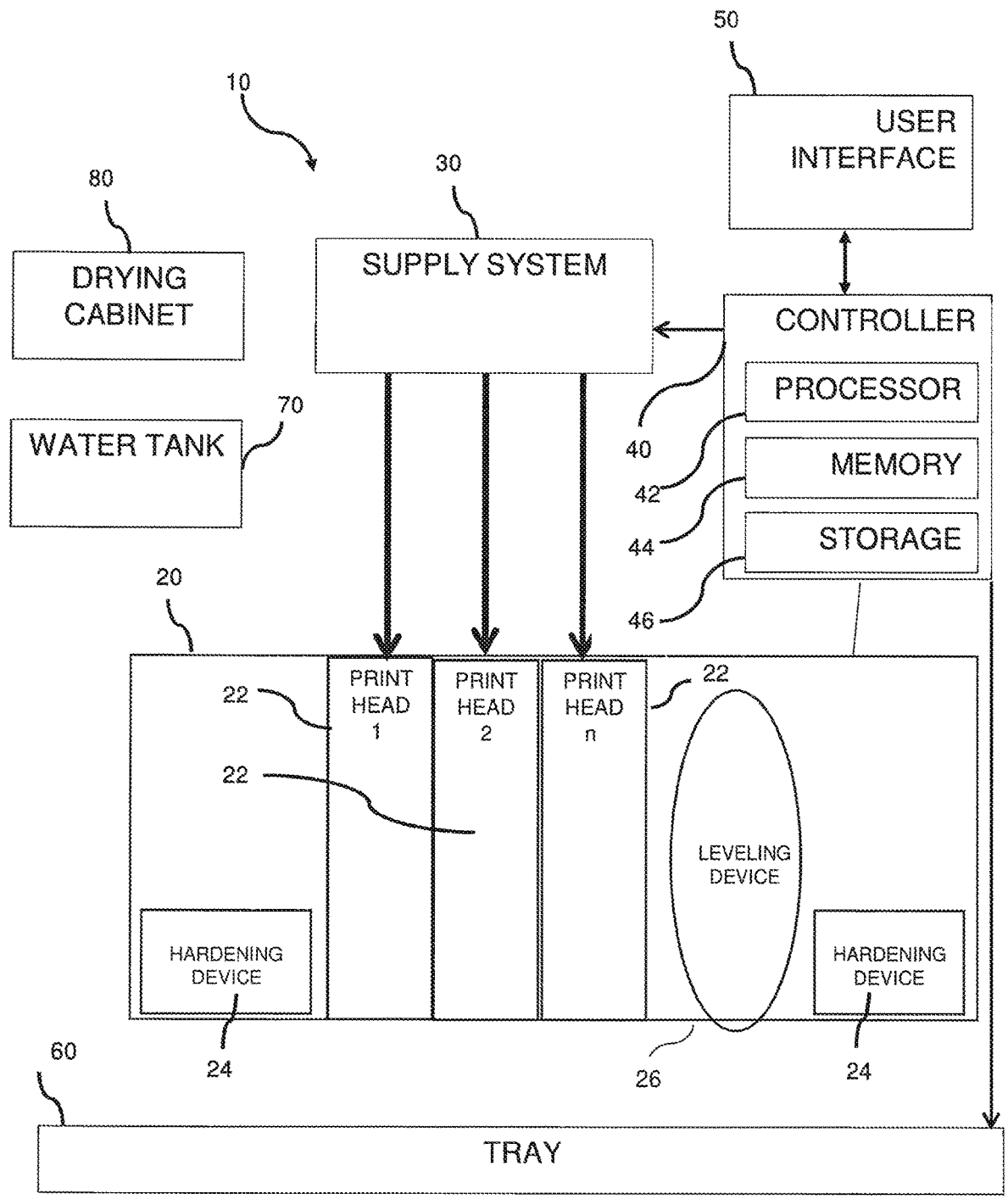
FIG. 2 is a high level block diagram of a system for building a three-dimensional object with a glossy surface according to some embodiments of the invention.

The method of FIG. 1 may be performed by any suitable 3D deposition system, for example, the deposition system diagrammatically represented in FIG. 2.

Reference is made to FIG. 2 which is a high level block diagram of a system 10 for building a three-dimensional object with a glossy surface according to some embodiments of the invention. System 10 may include a printing unit 20, a supply system 30, a controller 40, a user interface 50 and a fabrication platform or a tray 60. In some embodiments, system 10 may further include a water tank 70 and a drying cabinet 80. Controller 40 may be configured to control all of the elements of system 10.

Printing unit 20 may include one or more print heads 22, for example, print heads 1-$n$, one or more hardening devices 24, and one or more leveling devices 26. Print heads 22 may be configured to deposit material using any ink-jet method. Printing unit 20 may move horizontally in both X and Y directions. Printing unit may alternatively be configured to move vertically in the Z direction relatively to printing tray 60.

Print heads 22 may include a plurality of nozzles arranged in one or more linear arrays (not shown). Different print heads 22 may deposit different materials such that two or more materials may be deposited in a single deposition scan. For example, print heads 1 and 2 may be configured to print a first (e.g., body or modeling) material and print heads 3 and 4 may be configured to print a second (e.g., support) material. Print heads 22 may be supplied with the materials for deposition from supply system 30.

Hardening device/s 24 may include any device that is configured to emit light, heat and the like that may cause the printed material to harden. For example, hardening device 24 may include one or more ultraviolet (UV) lamps for curing the deposited material. Leveling device 26 may include any device that is configured to level and/or establish a thickness of a newly formed layer by sweeping over the layer and removing excess material. For example, leveling device 26 may be a roller. Leveling device 26 may include a waste collection device (not shown) for collecting excess material removed during leveling.

Supply system 30 may include two or more building material containers or cartridges for supplying a plurality of building materials to print heads 22. Building materials include modeling materials and support materials. In some embodiments, the body of the object may be formed by depositing two or more modeling materials which may combine after deposition to form a homogeneous material, or alternatively may combine digitally and heterogeneously after deposition, each material maintaining its individual properties, to form a digital or composite material. Deposition of building materials is controlled by controller 40.

Controller 40 may include a processor 42 that may be, for example, a central processing unit processor (CPU), a chip or any suitable computing or computational device. Controller 40 may further include: a memory 44 and storage unit 46. For example, processor 42 may control the movement of printing unit 20 in a desired direction. Memory 44 may include for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 44 may be or may include a plurality of possibly different memory units.

Memory 44 may include an executable code, e.g., an application, a program, a process, task or script. The executable code may include codes or instructions for controlling apparatus 10 to print 3D objects according to embodiments of the present invention. For example, memory 44 may include a code for depositing first material to form a body region of the 3D object, using for example, a first set of print heads 22. The code may further include depositing a second material to form a support region for the 3D object adjacent to the body of the object.

In some embodiments, memory 44 may include instructions to generate 3D cross sectional digital data comprising a set of horizontal slices. The instructions may further include depositing the first and second materials based on 3D digital data, such that, at least some of the slices are combined slices that include both a body region to be printed by the first material and a support region to be printed by the second material. The 3D digital data corresponding to cross section slices of the 3D body and the support regions may be stored in storage unit 46.

Storage unit 46 may store files that include design parameters of the 3D objects and the corresponding support structures to be printed by apparatus 10. For example, 3D computer aided design (CAD) files that include the design of the 3D object may be stored in storage unit 46. The files may include the dimensions and locations of the different regions of the 3D objects and the corresponding regions of the support construction.

Apparatus 10 may further include a user interface 50. User interface 50 may be or may include input devices such as, a mouse, a keyboard, a touchscreen or pad or any suitable input device. It will be recognized that any suitable number of input devices may be included in user interface 50. User interface 50 may further include output devices such as: one or more displays, speakers and/or any other suitable output devices. It will be recognized that any suitable number of output devices may be included in user interface 50. Any applicable input/output (I/O) devices may be connected to controller 40. For example, a wired or wireless network interface card (NIC), a modem, printer or facsimile machine, a universal serial bus (USB) device or external hard drive may be included in user interface 50. User interface 50 may allow a user to upload or update codes and instructions for controlling printing of 3D objects according to some embodiments of the invention and/or to upload and updates files comprising the design of the 3D objects (e.g., computer aided design (CAD) files) into storage unit 46.

Tray 60 may be any tray that is suitable to support ink-jet printing of 3D objects and the corresponding support constructions. Tray 60 may be configured to move in the Z direction relative to printing unit 20. Tray 60 may alternatively be attached or connected to an X-Y table and may be controlled, e.g., by controller 40, to move in the X-Y plane according to the requirements of the printing process.

Controller 40 may control printing unit 20 and/or tray 60 to cause a relative movement between the tray and print heads 22, such that each of print heads 22 may deposit droplets of printing material (e.g., modeling or support materials) at a predetermined location in the X-Y plane and at a predetermined height in the Z direction relative to tray 60.

Water tank 70 may be any tank configured to hold any aqueous solution for dissolving the support material. Tank 70 may include stirring devices for stirring the aqueous solution. For example, tank 70 may include internal whirlpool or Jacuzzi-like streams. Tank 70 may also include a heating unit and a control system to increase and maintain the water temperature at a desired level, for instance 40° C.

Drying cabinet 80 may be any drying location in which 3D objects may be left to dry, either at room temperature or at elevated temperatures. Drying cabinet 80 may include heating and/or ventilation units.

Reference is made to FIG. 3, which is an illustration of a 3D object (e.g., 3D product) being printed according to some embodiments of the invention. An object 300 may include a 3D body 310 that includes at least one modeling material. In some embodiments, the modeling material may include a multifunctional acrylic monomer. In some embodiments, the multifunctional acrylic monomer may be selected from a group consisting of: a diacrylate, triacrylate and tetraacrylate.

Support structure 330 may include at least one support material. In some embodiments, the support material may include a monofunctional hydrophilic acrylic monomer. In some embodiments, where support material may be deposited next to modeling material within a layer, the modeling material and support material may combine or mix at the interface between them to form an intermediate region 320. Intermediate region 320 may include a mixture of a monofunctional hydrophilic acrylic monomer and the multifunctional acrylic monomer. In some embodiments, the monofunctional hydrophilic acrylic monomer may be an acrylamide. For example, the monofunctional hydrophilic acrylic monomer may be selected from a group consisting of: N-Hydroxyethyl acrylamide (HEAA), N-Isopropylacrylamide (NIPAM), and any combination thereof.

In some embodiments, after printing is complete, the 3D object and its support construction, including the intermediate region between them, may be submerged in a water tank as described hereinabove, to dissolve and/or otherwise remove the support construction. The 3D object with its surface intermediate region 320 may be dried. After drying, the remnant intermediate layer may become glossy, giving the entire 3D object a glossy external appearance.

Herein throughout, a "curable material" is a compound (typically a monomeric or oligomeric compound, yet optionally a polymeric material) which, when exposed to a curing condition (e.g., curing energy), as described herein, solidifies or hardens to form a cured material. Curable materials are typically polymerizable materials, which undergo polymerization and/or cross-linking when exposed to suitable curing condition, typically a source of energy.

A curable material, according to the present embodiments, can harden or solidify (cure) while being exposed to a curing condition which can be a curing energy, and/or to another curing condition such as contact with a chemical reagent or exposure to the environment.

The terms "curable" and "solidifiable" as used herein are interchangeable.

According to some embodiments of the present invention, a curable material as described herein hardens upon undergoing polymerization, and is also referred to herein as a polymerizable material.

The polymerization can be, for example, free-radical polymerization, cationic polymerization or anionic polymerization, and each can be induced when exposed to curing energy such as, for example, radiation, heat, etc., as described herein, or to a curing condition other than curing energy.

In some of any of the embodiments described herein, a curable material is a photopolymerizable material, which polymerizes and/or undergoes cross-linking upon exposure to radiation, as described herein, and in some embodiments the curable material is a UV-curable material, which polymerizes and/or undergoes cross-linking upon exposure to UV or UV-vis radiation, as described herein.

In some embodiments, a curable material as described herein is a photopolymerizable material that polymerizes via photo-induced free-radical polymerization. Alternatively, the curable material is a photopolymerizable material that polymerizes via photo-induced cationic polymerization.

In some of any of the embodiments described herein, a curable material can be a monomer, an oligomer or a short-chain polymer, each being polymerizable and/or cross-linkable as described herein.

In some of any of the embodiments described herein, when a curable material is exposed to a curing condition (e.g., radiation), it hardens (solidifies, cures) by any one, or combination, of chain elongation and cross-linking.

In some of any of the embodiments described herein, a curable material is a monomer or a mixture of monomers which can form a polymeric material upon a polymerization reaction, when exposed to a curing condition (e.g., curing energy) at which the polymerization reaction occurs. Such curable materials are also referred to herein as monomeric curable materials.

In some of any of the embodiments described herein, a curable material is an oligomer or a mixture of oligomers which can form a polymeric material upon a polymerization reaction, when exposed to a curing condition (e.g., curing energy) at which the polymerization reaction occurs. Such curable materials are also referred to herein as oligomeric curable materials.

In some of any of the embodiments described herein, a curable material, whether monomeric or oligomeric, can be a mono-functional curable material or a multi-functional curable material.

Herein, a mono-functional (or "monofunctional") curable material comprises one functional group that can undergo polymerization when exposed to a curing condition such as curing energy (e.g., radiation).

A multi-functional (or "multifunctional") curable material comprises two or more, e.g., 2, 3, 4 or more, functional groups that can undergo polymerization when exposed to curing energy. Multi-functional curable materials can be, for example, di-functional, tri-functional or tetra-functional curable materials, which comprise 2, 3 or 4 groups that can undergo polymerization, respectively. The two or more functional groups in a multi-functional curable material are typically linked to one another by a linking moiety, as defined herein. When the linking moiety is an oligomeric or polymeric moiety, the multi-functional group is an oligomeric or polymeric multi-functional curable material. Multi-functional curable materials can undergo polymerization when subjected to curing energy and/or act as cross-linkers.

The final three-dimensional object is made of the modeling material formulation or a combination of modeling material formulations or modeling and support material formulations or modification thereof (e.g., following curing). All these operations are well-known to those skilled in the art of solid freeform fabrication.

In some exemplary embodiments of the invention an object is manufactured by dispensing two or more different building material formulations, each formulation from a different dispensing head of the AM. The building material formulations are optionally and preferably deposited in layers during the same pass of the printing heads. The formulations and combination of formulations within the layer are selected according to the desired properties of the object.

Herein throughout, the phrase "uncured building material" or "building material formulation" collectively describes the materials that are dispensed during the fabrication process so as to sequentially form the layers, as described herein. This phrase encompasses uncured materials (also referred to herein as building material formulation(s)) dispensed so as to form the printed object, namely, one or more uncured modeling material formulation(s), and uncured materials dispensed so as to form the support, namely uncured support material formulations.

The types of building material formulations can be categorized into two major categories: modeling material formulation and support material formulation. The support material formulation can serve as a supporting matrix or construction for supporting the object or object parts during the fabrication process and/or other purposes, e.g., providing hollow or porous objects. Support constructions may additionally include modeling material formulation elements, e.g. for further support strength. A building material formulation that provides a liquid or liquid-like material upon exposure to a curing condition can also be categorized, according to some embodiments of the present invention as a support material formulation.

Herein throughout, the phrases "cured modeling material" and "hardened modeling material" or simply "modeling material", which are used interchangeably, describe the part of the building material that forms a model object, as defined herein, upon exposing the dispensed building material to curing, and following removal of the support material. The cured or hardened modeling material can be a single hardened material or a mixture of two or more hardened materials, depending on the modeling material formulations used in the method, as described herein. A building material formulation that provides a liquid or liquid-like material upon exposure to a curing condition can also be categorized, according to some embodiments of the present invention as a modeling material formulation.

Herein throughout, the phrase "modeling material formulation", which is also referred to herein interchangeably as "modeling formulation", describes a part of the uncured building material which is dispensed so as to form the model object, as described herein. The modeling formulation is an uncured modeling formulation, which, upon exposure to a curing condition, forms the final object or a part thereof.

An uncured building material can comprise one or more modeling formulations, and can be dispensed such that different parts of the model object are made upon curing different modeling formulations, and hence are made of different cured modeling materials or different mixtures of cured modeling materials.

Herein throughout, the phrase "hardened support material" is also referred to herein interchangeably as "cured support material" or simply as "support material" and describes the part of the building material that is intended to support the fabricated final object during the fabrication process, and which is removed once the process is completed and a hardened modeling material is obtained.

Herein throughout, the phrase "support material formulation", which is also referred to herein interchangeably as "support formulation" or simply as "formulation", describes a part of the uncured building material which is dispensed so as to form the support material, as described herein. The support material formulation is an uncured formulation. When a support material formulation is a curable formulation, it forms, upon exposure to a curing condition, a hardened support material.

Support materials, which can be either liquid or liquid-like materials or hardened, typically gel or gel-like materials, are also referred to herein as sacrificial materials, which are removable after layers are dispensed and exposed to a curing energy, to thereby expose the shape of the final object.

Currently practiced support materials typically comprise a mixture of curable and non-curable materials, and are also referred to herein as gel-like support material or as gel support material.

Currently practiced support materials are typically water miscible, or water-dispersible or water-soluble.

Herein throughout, the term "water-miscible" describes a material which is at least partially dissolvable or dispersible in water, that is, at least 50% of the molecules move into the water upon mixture at room temperature. This term encompasses the terms "water-soluble" and "water dispersible".

Herein throughout, the term "water-soluble" describes a material that when mixed with water in equal volumes or weights, at room temperature, a homogeneous solution is formed.

Herein throughout, the term "water-dispersible" describes a material that forms a homogeneous dispersion when mixed with water in equal volumes or weights, at room temperature.

Herein throughout, the phrase "dissolution rate" describes a rate at which a substance is dissolved in a liquid medium. Dissolution rate can be determined, in the context of the present embodiments, by the time needed to dissolve a certain amount of a support material. The measured time is referred to herein as "dissolution time".

Herein throughout, whenever the phrase "weight percents" is indicated in the context of embodiments of a formulation (e.g., a building material formulation), it is meant weight percents of the total weight of the respective formulation.

The phrase "weight percents" is also referred to herein as "% by weight" or "% wt.".

According to an aspect of some embodiments of the present invention there is provided a formulation that is usable as a support material formulation in additive manufacturing of a three-dimensional object. According to some embodiments of the invention, the formulation provides, upon exposure to a curing condition, a material that features properties of a water-soluble material, as defined herein.

According to embodiments of the present invention, the formulation comprises a first hydrophilic monofunctional curable material; a second hydrophilic monofunctional curable material; and at least one water-miscible non-curable material, wherein a total amount of the curable materials is 90% or less, by weight, of the total weight of the formulation, and wherein a weight ratio of a total weight of said first hydrophilic monofunctional curable material and a total weight of said second hydrophilic monofunctional curable material ranges from 1:5 to 5:1.

According to some of any of the embodiments described herein, the formulation is devoid of acryloyl morpholine (ACMO).

In some of any of the embodiments described herein, the support material formulation is devoid of a multifunctional curable material.

By "devoid of" it is meant that an amount of the indicated material (e.g., ACMO) is no more than 2%, or no more than 1%, or no more than 0.5%, or no more than 0.1%, or no more than 0.5%, or no more than 0.1%, or no more than 0.05%, or no more than 0.01%, by weight, and can be even less or null.

According to some of any of the embodiments described herein, a total amount of the curable materials is 90% or less, by weight, of the total weight of the formulation, and can be, for example, 90, 80, 70, 60, 50, 40, 30, 20, 10, % by weight, or less, of the total weight of the formulation.

According to some of any of the embodiments described herein, a weight ratio of a total weight of said first hydrophilic monofunctional curable material and a total weight of said second hydrophilic monofunctional curable material ranges from 1:5 to 5:1, including any intermediate values and subranges therebetween, and can be, for example, 1:1, or 1:2, or 1:3, or 1:4, or 1:5, or 5:1, or 4:1, or 3:1, or 2:1.

According to some embodiments of the present invention, a total amount of the first hydrophilic monofunctional curable material ranges from 1 to 50, or from 10 to 40, or from 20 to 30, % by weight, of the total weight of the formulation.

According to some embodiments of the present invention, a total amount of the second hydrophilic monofunctional curable material ranges from 1 to 50, or from 10 to 40, or from 20 to 30, % by weight, of the total weight of the formulation.

According to some embodiments of the present invention, the at least one water-miscible non-curable material is in an amount of 1 to 50, % by weight, of the total weight of the formulation.

According to some embodiments of the present invention, the first hydrophilic monofunctional curable material is an acrylamide monomer or oligomer. According to some embodiments of the present invention, this acrylamide is an acrylamide comprising a tertiary amide moiety. According to some embodiments of the present invention, the acrylamide is N-Isopropylacrylamide (NIPAM).

According to some embodiments of the present invention, the second hydrophilic monofunctional curable material is an acrylamide monomer or oligomer. According to some embodiments of the present invention, this acrylamide is an acrylamide comprising a secondary amide moiety. According to some embodiments of the present invention, this acrylamide is N-Hydroxyethyl acrylamide (HEAA).

According to some embodiments of the present invention, the first hydrophilic monofunctional curable material and the second hydrophilic monofunctional curable material are acrylamides.

Herein throughout, the term "hydrophilic" describes a physical property of a compound or a portion of a compound (e.g., a chemical group in a compound) which accounts for transient formation of bond(s) with water molecules, typically through hydrogen bonding.

A hydrophilic compound or portion of a compound (e.g., a chemical group in a compound) is one that is typically charge-polarized and capable of hydrogen bonding.

Hydrophilic compounds or groups typically include one or more electron-donating heteroatoms which form strong hydrogen bonds with water molecules. Such heteroatoms include, but are not limited to, oxygen and nitrogen. Preferably, a ratio of the number of carbon atoms to a number of heteroatoms in a hydrophilic compounds or groups is 10:1 or lower, and can be, for example, 8:1, more preferably 7:1, 6:1, 5:1 or 4:1, or lower. It is to be noted that hydrophilicity of compounds and groups may result also from a ratio between hydrophobic and hydrophilic moieties in the compound or chemical group, and does not depend solely on the above-indicated ratio.

Hydrophilic compounds dissolve more readily in water than in oil or other hydrophobic solvents. Hydrophilic compounds can be determined by, for example, as having Log P lower than 0.5, when Log P is determined in octanol and water phases, at a temperature lower than 50° C., or lower than 40° C., or lower than 35° C. or lower than 30° C., e.g., at 25° C.

Alternatively, hydrophilic compounds can be determined by, for example, the Hansen parameters, as having relative energy distance (RED) higher than 1, when calculated for interaction with water as a solvent, at a temperature lower than 50° C., or lower than 40° C., or lower than 35° C. or lower than 30° C., e.g., at 25° C.

A hydrophilic compound can have one or more hydrophilic groups that render the compound hydrophilic. Such groups are typically polar groups, comprising one or more electron-donating heteroatoms such as oxygen and nitrogen. The hydrophilic group can be, for example, one or more substituent(s) of a monomeric mono-functional curable material or two or more substituents or interrupting groups of an oligomeric mono-functional curable material. The hydrophilic group can be, for example, one or more substituent(s) of a monomeric multi-functional curable material or one or more substituents or interrupting groups of a linking moiety of a monomeric multi-functional curable moiety. The hydrophilic group can be, for example, two or more substituents or interrupting groups of an oligomeric linking moiety in oligomeric multi-functional curable material.

Exemplary hydrophilic groups include, but are not limited to, an electron-donating heteroatom, a carboxylate, a thiocarboxylate, oxo (=O), a linear amide, hydroxy, a (C1-4) alkoxy, an (C1-4)alcohol, a heteroalicyclic (e.g., having a ratio of carbon atoms to heteroatoms as defined herein), a cyclic carboxylate such as lactone, a cyclic amide such as lactam, a carbamate, a thiocarbamate, a cyanurate, an isocyanurate, a thiocyanurate, urea, thiourea, an alkylene glycol (e.g., ethylene glycol or propylene glycol), and a hydrophilic polymeric or oligomeric moiety, as these terms are defined hereinunder, and any combinations thereof (e.g., a hydrophilic group that comprises two or more of the indicated hydrophilic groups).

In some embodiments, the hydrophilic group is, or comprises, an electron donating heteroatom, a carboxylate, a heteroalicyclic, an alkylene glycol and/or a hydrophilic oligomeric moiety.

A hydrophilic polymeric or oligomeric moiety, as used herein, comprises a polymeric chain which comprises hydrophilic groups as defined herein. The hydrophilic groups can be heteroatoms within the backbone chain of the polymeric moiety, as, for example, in poly(alkylene glycols) or hydrophilic pendant groups. A polymeric or oligomeric moiety, according to some embodiments of the present invention, preferably has from 10 to 40 repeating backbone units, more preferably from 10 to 20 repeating backbone units.

A hydrophilic mono-functional curable material according to some embodiments of the present invention can be a vinyl-containing compound represented by Formula I:

Formula I wherein at least one of $R_1$ and $R_2$ is and/or comprises a hydrophilic group, as defined herein.

The (=$CH_2$) group in Formula I represents a polymerizable group, and is typically a UV-curable group, such that the material is a UV-curable material.

For example, $R_1$ is a hydrophilic group as defined herein and $R_2$ is a non-hydrophilic group, for example, hydrogen, C(1-4) alkyl, C(1-4) alkoxy, or any other substituent, as long as the compound is hydrophilic, as defined herein.

In some embodiments, $R_1$ is a carboxylate, —C(=O)—OR' group, and $R_2$ is hydrogen, and the compound is a mono-functional acrylate monomer. In some of these embodiments, $R_2$ is methyl, and the compound is mono-functional methacrylate monomer. In other embodiments, $R_2$ is a hydrophilic substituent, namely, a substituent which is, or which comprises, a hydrophilic group as described herein.

In some of any of these embodiments, the carboxylate group, —C(=O)—OR', comprises R' which is a hydrophilic group. Exemplary R' groups include, but are not limited to, heteroalicyclic groups (having a ratio of 5:1 or lower of carbon atoms to electron-donating heteroatoms, such as morpholine, tetrahydrofurane, oxalidine, and the likes), hydroxyl, C(1-4)alkoxy, thiol, alkylene glycol or a polymeric or oligomeric moiety, as described herein. An exemplary monomeric mono-functional acrylate is N-Hydroxyethyl acrylamide (HEAA).

In some embodiments, $R_1$ is amide, and in some embodiments, it is a cyclic amide such as lactam, and the compound is a vinyl lactam. In some embodiments, $R_1$ is a cyclic carboxylate such as lactone, and the compound is a vinyl lactone.

When one or both of $R_1$ and $R_2$ comprise a polymeric or oligomeric moiety, for example, a hydrophilic oligomeric moiety, as defined herein, the mono-functional curable compound of Formula I is an exemplary oligomeric mono-functional curable material. Otherwise, it is an exemplary monomeric mono-functional curable material.

Exemplary oligomeric mono-functional curable materials include, but are not limited to, a mono-(meth)acrylated urethane oligomer derivative of polyethylene glycol, a mono-(meth)acrylated polyol oligomer, a mono-(meth)acrylated oligomer having hydrophilic substituents, and a mono-(meth)acrylated polyethylene glycol (e.g., methoxypolyethylene glycol). (Meth)acrylated means that the oligomer or polymer comprises an acrylate or methacrylate functional group.

In some embodiments, $R_1$ is a carboxylate and R' is a poly(alkylene glycol), as defined herein. An exemplary such hydrophilic monofunctional curable material is hexa(ethylene glycol) acrylate, (6-PEA).

In some embodiments, $R_1$ is a hydrophilic heteroalicyclic group, as defined herein.

In some embodiments, all of the monofunctional curable materials are hydrophilic and/or water-soluble or water-miscible materials, and in some embodiments, only two of these materials are hydrophilic and/or water-soluble or water-miscible materials.

In some embodiments, one or more of the monofunctional curable materials provides, when hardened per se, a material that is water-soluble.

In some embodiments, each of the monofunctional curable materials provides, when hardened per se, a material that is water-soluble.

In some embodiments, one or more of the monofunctional curable materials provides, when hardened per se, a material that is water-insoluble. Exemplary such materials include PEA6 and HEAA.

In some embodiments, each of the monofunctional curable materials provides, when hardened per se, a material that is water-insoluble.

In some embodiments, one or more of the monofunctional curable materials provides, when hardened per se, a material that is water-soluble, and one or more of the monofunctional curable materials provides, when hardened per se, a material that is water-insoluble.

In some of any of the embodiments described herein, at least one of the monofunctional curable material(s) is a curable material that comprises a hydroxyalkyl (e.g., HEAA) and/or an alkylene glycol moiety (e.g., a poly(alkylene glycol acrylate such as, for example, PEA6).

The formulation as described herein further comprises non-curable materials. In some embodiments, a total amount of the non-curable materials is between 1 to 90, or 10 to 80, or 20 to 60, or 30 to 50, % by weight, of the total weight of the formulation.

The term "non-curable" encompasses materials that are non-polymerizable under any conditions or materials that are non-curable under conditions at which the mono-functional and multifunctional curable materials as described herein are curable, or under any condition used in a fabrication of an object according to the present embodiments. Such materials are typically devoid of a polymerizable group or of a UV-photopolymerizable group. In some embodiments, the material is non-reactive towards the curable material as described herein, that is, it does not react with the curable material and is incapable of interfering with the curing of the curable materials, under the fabrication conditions, including the curing conditions.

In some of any of the embodiments described herein the non-curable material is water soluble or water dispersible or water miscible material, as defined herein.

In some of any of the embodiments described herein, one or more, or each, of the non-curable material(s) is a water-miscible or water-soluble material.

In some of any of the embodiments described herein, one or more of the non-curable materials is a polymeric material, for example, a water-miscible or water-soluble polymeric material.

In some embodiments, the non-curable material is a polymeric material which comprises a plurality of hydrophilic groups as defined herein, either within the backbone chain of the polymer or as pendant groups. Exemplary such polymeric materials are polyols. Some representative examples include, but are not limited to, Polyol 3165, polypropylene glycol, polyethylene glycol, polyglycerol, polyglyme, ethoxylated forms of these polymers, paraffin oil and the like, and any combination thereof.

In exemplary embodiments, the non-curable polymeric material comprises poly(ethylene glycol) and/or polyol 3165.

The polymeric materials can be of any molecular weight. In some embodiments, the one or more polymeric materials and an amount thereof are selected such that the formulation features a viscosity that is suitable for the additive manufacturing method, as described herein.

In some of any of the embodiments described herein, a polymeric material has a MW of at least 500, or at least 600 grams/mol.

In some of any of the embodiments described herein, a polymeric material has a MW of no more than 3000, or nor more than 2500, or no more than 2000 or no more than 1500, grams/mol.

In some of any of the embodiments described herein, a polymeric material has a MW of from about 500 to about 2500 grams/mol, including any intermediate value and subranges therebetween.

In some of any of the embodiments described herein, the one or more non-curable material(s) comprise a non-polymeric material, for example, a water-soluble or water-miscible non-polymeric material.

Exemplary such non-curable, non-polymeric material, include, but are not limited to, water, propane diol (e.g., 1,2-propandoil, also referred to herein and in the art as propylene glycol), propane triol, glycerol, butyl diglyme (Butyl Di Glycol Acetate, Diethylene glycol butyl ether acetate,2-(2-Butoxyethoxy)ethyl acetate), Diethylene glycol monobutyl ether (BDG), (EDGAc) Diethylene glycol monoethyl ether acetate (EDGAc; DGMEA), Di(ethylene glycol) ethyl ether (DEGEE), Tri(propyleneglycol)methyl ether, Dipropylene glycol monomethyl ether (DPGME), Di(propylene glycol) methyl ether acetate (DPGMEA), propylene carbonate (1,2-Propanediol cyclic carbonate, 4-Methyl-1,3-dioxolan-2-one), Diethylene glycol methyl ether (DGME), Diethylene glycol methyl ether (TGMME), 1-Methoxy-2-propanol (PGME/PM; Propyleneglycol monomethyl ether), and Propylene glycol monomethyl ether acetate (PGMEA).

In some of any of the embodiments described herein, the formulation comprises a water-miscible, non-curable material which comprises a mixture of two or more of the polymeric and non-polymeric water-miscible, non-curable materials described herein. An exemplary such a mixture may comprise two or more of a poly(ethylene glycol), a propane diol, glycerol and a polyol such as Polyol 3165.

In some of these embodiments, a weight ratio of a total weight of the one or more polymeric non-curable material(s) and a total weight of the one or more non-polymeric non-curable material(s) ranges from 2:1 to 1:2, including any intermediate values and subranges therebetween.

An exemplary, non-limiting, formulation according to the present embodiments comprises: a first hydrophilic monofunctional curable material, in an amount of from 20 to 40, % by weight; a second hydrophilic monofunctional curable material in an amount of from 20 to 40, % by weight; and at least one water-miscible non-curable material in an amount of from 30 to 50, % by weight.

In some of any of the embodiments described herein, the formulation is usable in additive manufacturing such as 3D inkjet printing.

In some of any of the embodiments described herein, the formulation features properties (e.g., viscosity, surface tension, jettability) that are suitable for additive manufacturing such as 3D inkjet printing, as described herein.

In some embodiments, the formulation features a viscosity of from 8 to 40, or from 8 to 30, or from 8 to 25, centipoises at the jetting temperature (e.g., at 75° C.).

In some of any of the embodiments described herein, and as discussed hereinabove, the formulation provides, when hardened, a material that features properties of weak gel.

In some of any of the embodiments described herein, one or more, and preferably each, of the monofunctional and multifunctional curable materials is a UV-curable material.

In some of any of the embodiments described herein, one or more, and preferably each, of the monofunctional and multifunctional curable materials is an acrylic material, as defined herein.

In some of any of the embodiments described herein, the formulation further comprises a one or more photoinitiator(s). In some of these embodiments, a total amount of the photoinitiator is no more than 10% by weight of the total weight of the formulation, and can be, for example, in a range of from 0.1 to 10%, or from 0.1 to 5%, or from 0.5 to 3%, by weight, including any intermediate values and subranges therebetween. The photoinitiator can be a free radical photo-initiator, a cationic photo-initiator, or any combination thereof. A free radical photoinitiator may be any compound that produces a free radical upon exposure to radiation such as ultraviolet or visible radiation and thereby initiates a polymerization reaction. Non-limiting examples of suitable photoinitiators include phenyl ketones, such as alkyl/cycloalkyl phenyl ketones, benzophenones (aromatic ketones) such as benzophenone, methyl benzophenone, Michler's ketone and xanthones; acylphosphine oxide type photo-initiators such as 2,4,6-trimethylbenzolydiphenyl phosphine oxide (TMPO), 2,4,6-trimethylbenzoylethoxyphenyl phosphine oxide (TEPO), and bisacylphosphine oxides (BAPO's); benzoins and benzoin alkyl ethers such as benzoin, benzoin methyl ether and benzoin isopropyl ether and the like. Examples of photoinitiators are alpha-amino ketone, and 1-hydroxycyclohexyl phenyl ketone (e.g., marketed as Irgacure®184). A free-radical photo-initiator may be used alone or in combination with a co-initiator. Co-initiators are used with initiators that need a second molecule to produce a radical that is active in the UV-systems. Benzophenone is an example of a photoinitiator that requires a second molecule, such as an amine, to produce a curable radical. After absorbing radiation, benzophenone reacts with a ternary amine by hydrogen abstraction, to generate an alpha-amino radical which initiates polymerization of acrylates. Non-limiting example of a class of co-initiators are alkanolamines such as triethylamine, methyldiethanolamine and triethanolamine. Suitable cationic photoinitiators include, for example, compounds which form aprotic acids or Bronsted acids upon exposure to ultraviolet and/or visible light sufficient to initiate polymerization. The photoinitiator used may be a single compound, a mixture of two or more active compounds, or a combination of two or more different compounds, i.e. co-initiators. Non-limiting examples of suitable cationic photoinitiators include aryldiazonium salts, diaryliodonium salts, triarylsulphonium salts, triarylselenonium salts and the like. An exemplary cationic photoinitiator is a mixture of triarylsolfonium hexafluoroantimonate salts.

In some of any of the embodiments described herein, the formulation may further comprise one or more additives that are beneficially used in the fabrication process. Such additives include, for example, polymerization inhibitors, stabilizers, pigments, dyes, and surface-active agents.

In some embodiments, a support material formulation as described herein comprises a surface-active agent. A surface-active agent may be used to reduce the surface tension of the formulation to the value required for jetting or for other printing process, which is typically around 30 dyne/cm. An exemplary such agent is a silicone surface additive such as, but not limited to, surface active agents marketed as the BYK-345 family.

In some embodiments, a support material formulation as described herein further comprises an inhibitor, which inhibits pre-polymerization of the curable material during the fabrication process and before it is subjected to curing conditions. An exemplary stabilizer (inhibitor) is Tris(N-nitroso-N-phenylhydroxylamine) Aluminum Salt (NPAL) (e.g., as marketed under FirstCure® NPAL).

Suitable stabilizers include, for example, thermal stabilizers, which stabilize the formulation at high temperatures.

Reference is made to FIGS. 4A-4C, which present images of 3D printed objects according to some embodiments of the invention. FIG. 4A presents an image of 6 3D objects (2 Buddha statues, 2 owls and 2 dinosaur heads) following the dissolving of the support material (e.g., as disclosed, for example, in box 140 of FIG. 1). As can be seen, the intermediate region at the surface of the objects is still thick and has a matte appearance. FIG. 4B is an image of the 6 objects after 24 hours of drying at room temperature. As can be seen, the surface layer has become less swollen and slightly glossy. After 48 hours of drying, as presented in FIG. 4C the 6 objects have glossy surfaces.

It is expected that during the life of a patent maturing from this application many relevant curable and non-curable will be developed and the scope of the materials described and claimed herein is intended to include all such new technologies a priori.

As used herein the term "about" refers to ±10% or ±5%.

The terms "comprises", "comprising", "includes", "including", "having" and their conjugates mean "including but not limited to".

The term "consisting of means" "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

Herein, the phrase "acrylic material" encompasses acrylate, methacrylate, acrylamide and methacrylamide compounds.

Herein throughout, the term "(meth)acrylic" encompasses acrylic and methacrylic compounds.

Herein throughout, the phrase "linking moiety" or "linking group" describes a group that connects two or more moieties or groups in a compound. A linking moiety is typically derived from a bi- or tri-functional compound, and can be regarded as a bi- or tri-radical moiety, which is connected to two or three other moieties, via two or three atoms thereof, respectively.

Exemplary linking moieties include a hydrocarbon moiety or chain, optionally interrupted by one or more heteroatoms, as defined herein, and/or any of the chemical groups listed below, when defined as linking groups.

When a chemical group is referred to herein as "end group" it is to be interpreted as a substituent, which is connected to another group via one atom thereof.

Herein throughout, the term "hydrocarbon" collectively describes a chemical group composed mainly of carbon and hydrogen atoms. A hydrocarbon can be comprised of alkyl, alkene, alkyne, aryl, and/or cycloalkyl, each can be substituted or unsubstituted, and can be interrupted by one or more heteroatoms. The number of carbon atoms can range from 2 to 20, and is preferably lower, e.g., from 1 to 10, or from 1 to 6, or from 1 to 4. A hydrocarbon can be a linking group or an end group. Bisphenol A is an example of a hydrocarbon comprised of 2 aryl groups and one alkyl group.

As used herein, the term "amine" describes both a —NR'R" group and a —NR'— group, wherein R' and R" are each independently hydrogen, alkyl, cycloalkyl, aryl, as these terms are defined hereinbelow. The amine group can therefore be a primary amine, where both R' and R" are hydrogen, a secondary amine, where R' is hydrogen and R" is alkyl, cycloalkyl or aryl, or a tertiary amine, where each of R' and R" is independently alkyl, cycloalkyl or aryl. Alternatively, R' and R" can each independently be hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, carbonyl, C-carboxylate, O-carboxylate, N thiocarbamate, O thiocarbamate, urea, thiourea, N carbamate, O carbamate, C-amide, N amide, guanyl, guanidine and hydrazine.

The term "amine" is used herein to describe a —NR'R" group in cases where the amine is an end group, as defined hereinunder, and is used herein to describe a —NR'— group in cases where the amine is a linking group or is or part of a linking moiety.

The term "alkyl" describes a saturated aliphatic hydrocarbon including straight chain and branched chain groups. Preferably, the alkyl group has 1 to 30, or 1 to 20 carbon atoms. Whenever a numerical range; e.g., "1-20", is stated herein, it implies that the group, in this case the alkyl group, may contain 1 carbon atom, 2 carbon atoms, 3 carbon atoms, etc., up to and including 20 carbon atoms. The alkyl group may be substituted or unsubstituted. Substituted alkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N thiocarbamate, O thiocarbamate, urea, thiourea, N carbamate, O carbamate, C-amide, N-amide, guanyl, guanidine and hydrazine.

The alkyl group can be an end group, as this phrase is defined hereinabove, wherein it is attached to a single adjacent atom, or a linking group, as this phrase is defined hereinabove, which connects two or more moieties via at least two carbons in its chain. When the alkyl is a linking group, it is also referred to herein as "alkylene" or "alkylene chain".

Herein, a C(1-4) alkyl, substituted by a hydrophilic group, as defined herein, is included under the phrase "hydrophilic group" herein.

Alkene and Alkyne, as used herein, are an alkyl, as defined herein, which contains one or more double bond or triple bond, respectively.

The term "cycloalkyl" describes an all-carbon monocyclic ring or fused rings (i.e., rings which share an adjacent pair of carbon atoms) group where one or more of the rings does not have a completely conjugated pi-electron system. Examples include, without limitation, cyclohexane, adamantine, norbornyl, isobornyl, and the like. The cycloalkyl group may be substituted or unsubstituted. Substituted cycloalkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N thiocarbamate, O thiocarbamate, urea, thiourea, N carbamate, O carbamate, C amide, N amide, guanyl, guanidine and hydrazine. The cycloalkyl group can be an end group, as this phrase is defined hereinabove, wherein it is attached to a single adjacent atom, or a linking group, as this phrase is defined hereinabove, connecting two or more moieties at two or more positions thereof.

Cycloalkyls of 1-6 carbon atoms, substituted by two or more hydrophilic groups, as defined herein, is included under the phrase "hydrophilic group" herein.

The term "heteroalicyclic" describes a monocyclic or fused ring group having in the ring(s) one or more atoms such as nitrogen, oxygen and sulfur. The rings may also have one or more double bonds. However, the rings do not have a completely conjugated pi-electron system. Representative examples are piperidine, piperazine, tetrahydrofurane, tetrahydropyrane, morpholino, oxalidine, and the like.

The heteroalicyclic may be substituted or unsubstituted. Substituted heteroalicyclic may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N thiocarbamate, O thiocarbamate, urea, thiourea, O-carbamate, N-carbamate, C-amide, N-amide, guanyl, guanidine and hydrazine. The heteroalicyclic group can be an end group, as this phrase is defined hereinabove, where it is attached to a single adjacent atom, or a linking group, as this phrase is defined hereinabove, connecting two or more moieties at two or more positions thereof.

A heteroalicyclic group which includes one or more of electron-donating atoms such as nitrogen and oxygen, and in which a numeral ratio of carbon atoms to heteroatoms is 5:1 or lower, is included under the phrase "hydrophilic group" herein.

The term "aryl" describes an all-carbon monocyclic or fused-ring polycyclic (i.e., rings which share adjacent pairs of carbon atoms) groups having a completely conjugated pi-electron system. The aryl group may be substituted or unsubstituted. Substituted aryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N thiocarbamate, O thiocarbamate, urea, thiourea, N carbamate, O carbamate, C-amide, N-amide, guanyl, guanidine and hydrazine. The aryl group can be an end group, as this term is defined hereinabove, wherein it is attached to a single adjacent atom, or a linking group, as this term is defined hereinabove, connecting two or more moieties at two or more positions thereof.

The term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Examples, without limitation, of heteroaryl groups include pyrrole, furan, thiophene, imidazole, oxazole, thiazole, pyrazole, pyridine, pyrimidine, quinoline, isoquinoline and purine. The heteroaryl group may be substituted or unsubstituted. Substituted heteroaryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N thiocarbamate, O thiocarbamate, urea, thiourea, O-carbamate, N-carbamate, C-amide, N-amide, guanyl, guanidine and hydrazine. The heteroaryl group can be an end group, as this phrase is defined hereinabove, where it is attached to a single adjacent atom, or a linking group, as this phrase is defined hereinabove, connecting two or more moieties at two or more positions thereof. Representative examples are pyridine, pyrrole, oxazole, indole, purine and the like.

The term "halide" and "halo" describes fluorine, chlorine, bromine or iodine.

The term "haloalkyl" describes an alkyl group as defined above, further substituted by one or more halide.

The term "sulfate" describes a —O—S(=O)2-OR' end group, as this term is defined hereinabove, or an —O—S(=O)2-O— linking group, as these phrases are defined hereinabove, where R' is as defined hereinabove.

The term "thiosulfate" describes a —O—S(=S)(=O)—OR' end group or a —O—S(=S)(=O)—O— linking group, as these phrases are defined hereinabove, where R' is as defined hereinabove.

The term "sulfite" describes an —O—S(=O)—O—R' end group or a OS(=O) O— group linking group, as these phrases are defined hereinabove, where R' is as defined hereinabove.

The term "thiosulfite" describes a —O—S(=S)—O—R' end group or an —O—S(=S)—O— group linking group, as these phrases are defined hereinabove, where R' is as defined hereinabove.

The term "sulfinate" describes a —S(=O)—OR' end group or an —S(=O)—O— group linking group, as these phrases are defined hereinabove, where R' is as defined hereinabove.

The term "sulfoxide" or "sulfinyl" describes a —S(=O)R' end group or an —S(=O)— linking group, as these phrases are defined hereinabove, where R' is as defined hereinabove.

The term "sulfonate" describes a —S(=O)2-R' end group or an —S(=O)2-linking group, as these phrases are defined hereinabove, where R' is as defined herein.

The term "S-sulfonamide" describes a —S(=O)2-NR'R" end group or a —S(=O)2-NR'-linking group, as these phrases are defined hereinabove, with R' and R" as defined herein.

The term "N-sulfonamide" describes an R'S(=O)2-NR"— end group or a S(=O)2 NR'— linking group, as these phrases are defined hereinabove, where R' and R" are as defined herein.

The term "disulfide" refers to a —S—SR' end group or a —S—S— linking group, as these phrases are defined hereinabove, where R' is as defined herein.

The term "phosphonate" describes a —P(=O)(OR')(OR") end group or a P(=O)(OR')(O)— linking group, as these phrases are defined hereinabove, with R' and R" as defined herein.

The term "thiophosphonate" describes a —P(=S)(OR')(OR") end group or a P(=S)(OR')(O)— linking group, as these phrases are defined hereinabove, with R' and R" as defined herein.

The term "phosphinyl" describes a —PR'R" end group or a —PR'— linking group, as these phrases are defined hereinabove, with R' and R" as defined hereinabove.

The term "phosphine oxide" describes a —P(=O)(R')(R") end group or a P(=O)(R') linking group, as these phrases are defined hereinabove, with R' and R" as defined herein.

The term "phosphine sulfide" describes a —P(=S)(R')(R") end group or a P(=S)(R') linking group, as these phrases are defined hereinabove, with R' and R" as defined herein.

The term "phosphite" describes an —O—PR'(=O)(OR") end group or an —O—PH(=O)(O)— linking group, as these phrases are defined hereinabove, with R' and R" as defined herein.

The term "carbonyl" or "carbonate" as used herein, describes a —C(=O)—R' end group or a —C(=O)— linking group, as these phrases are defined hereinabove, with R' as defined herein.

The term "thiocarbonyl" as used herein, describes a —C(=S)—R' end group or a —C(=S)— linking group, as these phrases are defined hereinabove, with R' as defined herein.

The term "oxo" as used herein, describes a (=O) group, wherein an oxygen atom is linked by a double bond to the atom (e.g., carbon atom) at the indicated position.

The term "thiooxo" as used herein, describes a (=S) group, wherein a sulfur atom is linked by a double bond to the atom (e.g., carbon atom) at the indicated position.

The term "oxime" describes a =N—OH end group or a =N—O— linking group, as these phrases are defined hereinabove.

The term "hydroxyl" describes a —OH group.

The term "alkoxy" describes both an —O-alkyl and an —O-cycloalkyl group, as defined herein.

The term "aryloxy" describes both an —O-aryl and an —O-heteroaryl group, as defined herein.

The term "thiohydroxy" describes a —SH group.

The term "thioalkoxy" describes both a —S-alkyl group, and a —S-cycloalkyl group, as defined herein.

The term "thioaryloxy" describes both a —S-aryl and a —S-heteroaryl group, as defined herein.

The "hydroxyalkyl" is also referred to herein as "alcohol", and describes an alkyl, as defined herein, substituted by a hydroxy group.

The term "cyano" describes a —C≡N group.

The term "isocyanate" describes an —N═C═O group.

The term "isothiocyanate" describes an —N═C═S group.

The term "nitro" describes an —NO2 group.

The term "acyl halide" describes a —(C═O)R'''' group wherein R'''' is halide, as defined hereinabove.

The term "azo" or "diazo" describes an —N═NR' end group or an —N═N linking group, as these phrases are defined hereinabove, with R' as defined hereinabove.

The term "peroxo" describes an —O—OR' end group or an —O—O linking group, as these phrases are defined hereinabove, with R' as defined hereinabove.

The term "carboxylate" as used herein encompasses C-carboxylate and O-carboxylate.

The term "C carboxylate" describes a —C(═O)—OR' end group or a —C(═O)—O linking group, as these phrases are defined hereinabove, where R' is as defined herein.

The term "O carboxylate" describes a —OC(═O)R' end group or a —OC(═O) linking group, as these phrases are defined hereinabove, where R' is as defined herein.

A carboxylate can be linear or cyclic. When cyclic, R' and the carbon atom are linked together to form a ring, in C-carboxylate, and this group is also referred to as lactone. Alternatively, R' and O are linked together to form a ring in O-carboxylate. Cyclic carboxylates can function as a linking group, for example, when an atom in the formed ring is linked to another group.

The term "thiocarboxylate" as used herein encompasses C-thiocarboxylate and O-thiocarboxylate.

The term "C thiocarboxylate" describes a —C(═S)—OR' end group or a —C(═S)—O linking group, as these phrases are defined hereinabove, where R' is as defined herein.

The term "O thiocarboxylate" describes a —OC(═S)R' end group or a —OC(═S) linking group, as these phrases are defined hereinabove, where R' is as defined herein.

A thiocarboxylate can be linear or cyclic. When cyclic, R' and the carbon atom are linked together to form a ring, in C-thiocarboxylate, and this group is also referred to as thiolactone. Alternatively, R' and O are linked together to form a ring in O-thiocarboxylate. Cyclic thiocarboxylates can function as a linking group, for example, when an atom in the formed ring is linked to another group.

The term "carbamate" as used herein encompasses N-carbamate and O-carbamate.

The term "N-carbamate" describes an R"OC(═O)—NR'— end group or a OC(═O)—NR'-linking group, as these phrases are defined hereinabove, with R' and R" as defined herein.

The term "O-carbamate" describes an —OC(═O)—NR'R" end group or an —OC(═O)—NR' linking group, as these phrases are defined hereinabove, with R' and R" as defined herein.

A carbamate can be linear or cyclic. When cyclic, R' and the carbon atom are linked together to form a ring, in O-carbamate. Alternatively, R' and O are linked together to form a ring in N-carbamate. Cyclic carbamates can function as a linking group, for example, when an atom in the formed ring is linked to another group.

The term "carbamate" as used herein encompasses N-carbamate and O-carbamate.

The term "thiocarbamate" as used herein encompasses N-thiocarbamate and O-thiocarbamate.

The term "O-thiocarbamate" describes a OC(═S) NR'R" end group or a OC(═S) NR' linking group, as these phrases are defined hereinabove, with R' and R" as defined herein.

The term "N-thiocarbamate" describes an R"OC(═S) NR'— end group or a OC(═S)NR'-linking group, as these phrases are defined hereinabove, with R' and R" as defined herein.

Thiocarbamates can be linear or cyclic, as described herein for carbamates.

The term "dithiocarbamate" as used herein encompasses S-dithiocarbamate and N-dithiocarbamate.

The term "S-dithiocarbamate" describes a SC(═S) NR'R" end group or a SC(═S)NR' linking group, as these phrases are defined hereinabove, with R' and R" as defined herein.

The term "N-dithiocarbamate" describes an R"SC(═S) NR'— end group or a SC(═S)NR'-linking group, as these phrases are defined hereinabove, with R' and R" as defined herein.

The term "urea", which is also referred to herein as "ureido", describes a NR'C(═O)—NR"R''' end group or a NR'C(═O)—NR" linking group, as these phrases are defined hereinabove, where R' and R" are as defined herein and R''' is as defined herein for R' and R".

The term "thiourea", which is also referred to herein as "thioureido", describes a —NR'—C(═S)—NR"R''' end group or a —NR'—C(═S)—NR" linking group, with R', R" and R''' as defined herein.

The term "amide" as used herein encompasses C-amide and N-amide.

The term "C-amide" describes a —C(═O)—NR'R" end group or a —C(═O)—NR' linking group, as these phrases are defined hereinabove, where R' and R" are as defined herein.

The term "N-amide" describes a R'C(═O)—NR"— end group or a R'C(═O)—N— linking group, as these phrases are defined hereinabove, where R' and R" are as defined herein.

An amide can be linear or cyclic. When cyclic, R' and the carbon atom are linked together to form a ring, in C-amide, and this group is also referred to as lactam. Cyclic amides can function as a linking group, for example, when an atom in the formed ring is linked to another group.

The term "guanyl" describes a R'R"NC(═N)— end group or a —R'NC(═N)— linking group, as these phrases are defined hereinabove, where R' and R" are as defined herein.

The term "guanidine" describes a —R'NC(═N)—NR"R''' end group or a —R'NC(═N) NR" linking group, as these phrases are defined hereinabove, where R', R" and R''' are as defined herein.

The term "hydrazine" describes a —NR'—NR"R''' end group or a —NR'—NR" linking group, as these phrases are defined hereinabove, with R', R", and R''' as defined herein.

As used herein, the term "hydrazide" describes a —C(═O)—NR' NR"R''' end group or a —C(═O)—NR'—NR" linking group, as these phrases are defined hereinabove, where R', R" and R''' are as defined herein.

As used herein, the term "thiohydrazide" describes a —C(=S)—NR' NR"R'" end group or a —C(=S)—NR'—NR" linking group, as these phrases are defined hereinabove, where R', R" and R'" are as defined herein.

As used herein, the term "alkylene glycol" describes a —O—[(CR' R")z-O]y-R'" end group or a —O—[(CR'R")z-O]y-linking group, with R', R" and R'" being as defined herein, and with z being an integer of from 1 to 10, preferably, from 2 to 6, more preferably 2 or 3, and y being an integer of 1 or more. Preferably R' and R" are both hydrogen. When z is 2 and y is 1, this group is ethylene glycol. When z is 3 and y is 1, this group is propylene glycol. When y is 2-4, the alkylene glycol is referred to herein as oligo(alkylene glycol).

When y is greater than 4, the alkylene glycol is referred to herein as poly(alkylene glycol). In some embodiments of the present invention, a poly(alkylene glycol) group or moiety can have from 10 to 200 repeating alkylene glycol units, such that z is 10 to 200, preferably 10-100, more preferably 10-50.

The term "silanol" describes a —Si(OH)R'R" group, or —Si(OH)2R' group or —Si(OH)3 group, with R' and R" as described herein.

The term "silyl" describes a —SiR' R"R'" group, with R', R" and R'" as described herein.

As used herein, the term "urethane" or "urethane moiety" or "urethane group" describes a Rx-O—C(=O)—NR'R" end group or a -Rx-O—C(=O)—NR'— linking group, with R' and R" being as defined herein, and Rx being an alkyl, cycloalkyl, aryl, alkylene glycol or any combination thereof. Preferably R' and R" are both hydrogen.

The term "polyurethane" or "oligourethane" describes a moiety that comprises at least one urethane group as described herein in the repeating backbone units thereof, or at least one urethane bond, —O—C(=O)—NR'—, in the repeating backbone units thereof.

As used herein, the term "glossy" or "glossy effect" relates to a property of at least part of the printed object which seems shiny and smooth as opposed to a "matte" effect.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Printing experiments were performed with an Objet 260 Connex3 printer (Stratasys Ltd., Israel). The modeling material used in the experiments was VeroClear™ RGD810 (Stratasys Ltd., Israel). Various support formulations were printed in combination with RGD810 and tested for their jettability, water solubility, and glossy effect after drying of the 3D printed model. Support formulations and related results are shown in Table 1 below. Raw Materials are as follows: A: NIPAM (10-50 wt. %); B: ACMO (10-75 wt. %); C: HEAA (10-50%); D: DMAPAA-Q (1-10 wt. %); E: PEA-6 (1-10 wt. %); F: Genomer1122 (1-10 wt. %); G: MPEG260LD (GEO)(10-30 wt. %); H: SR285 (1-10 wt. %); I: Acrylic acid (1-10 wt.5); J: D-sorbitol (1-10 wt. %); K: Distilled water (1-15 wt. %); L: polyol 3165 (30-60 wt. %); M: PEG400 (10-50 wt. %); N: Polyvinyl pyrolidone (PVP) (1-15 wt. %); O: Photoinitiator (1-10 wt. %); P: Polymerization inhibitor (0.01-1 wt. %).

TABLE 1

| Formulation Material | #1 | #2 | #3 | #4 | #5 | #6 | #7 | #8 | #9 | #10 | #11 | #R1 | #R2 | #R3 | #R4 | #R5 |
|---|---|---|---|---|---|---|---|---|---|---|---|---|---|---|---|---|
| A | 25 | 20 | 25 | 24 | 25 | 30 | 40 | 20 | 23 | 25 | 20 | 20 | 25 | 25 | 25 | 20 |
| B |  |  |  |  |  |  |  |  |  |  |  | 15 | 25 |  |  |  |
| C | 25 | 23 | 25 | 24 | 25 | 30 | 40 | 25 | 25 | 25 | 25 |  |  | 20 |  | 25 |
| D |  |  |  |  |  |  |  |  |  |  |  |  |  |  |  | 4 |
| E |  |  |  |  |  |  |  |  |  |  |  |  |  | 5 |  |  |
| F |  |  |  |  |  |  | 5 | 2 |  | 5 |  |  |  |  |  |  |
| G |  |  |  |  |  |  |  |  |  |  |  |  |  |  | 25 |  |
| H |  | 5 |  |  |  |  |  |  |  |  |  |  |  |  |  |  |
| I |  |  |  |  |  | 5 |  |  |  |  |  |  |  |  |  |  |
| J |  | 2 | 2 | 2 | 2 |  |  | 2 | 2 | 2 |  | 2 | 2 | 2 | 2 |  |
| K | 9 | 9 | 9 | 9 |  |  |  | 9 | 9 | 9 |  | 9 |  |  | 9 | 9 |
| L | 39 | 39 | 37 | 37 |  |  | 44 | 35 | 35 | 40 | 56 | 35 |  |  | 35 | 39 |
| M |  |  |  |  | 44 | 37 |  |  |  |  |  |  | 44 |  |  |  |
| N |  |  |  |  |  |  |  | 5 |  |  |  |  |  |  |  |  |
| O | 1 | 1 | 1 | 3 | 3 | 3 | 9 | 3 | 3 | 3 | 1.5 | 1 | 3 | 3 | 3 | 1.5 |
| P | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 |
| Jettable | Pass | Pass | Pass | Pass | Pass | Pass | Pass | Pass | Pass | Pass | Pass | Pass | Pass | Pass | Pass | Pass |
| Glossy effect | Yes | Yes | Yes | Yes | Yes | Yes | Yes | Yes | Yes | Yes | Yes | No | No | No | No | No |
| Water soluble | Yes | Yes | Yes | Yes | Yes | Yes | Yes | Yes | Yes | Yes | Yes | Yes | Yes | No | Yes | Yes |

The results of the experiments show that the presence of ACMO seems to have a negative impact on the glossy effect, while the presence of NIPAM (N-Isopropylacrylamide; Sigma-Aldrich) and HEAA (N-Hydroxyethyl acrylamide; KJ Chemicals Corp., Japan) seem to have a positive effect. The chemical composition of some successful support formulations that presented the required quality in term of jettability, water solubility, and glossy effect after drying are reported in Table 1 (#1 to #11). Reference formulations are shown in Table 1 (#R1 to #R5). It should be noted that none of the support formulations of the invention comprises an acrylate crosslinker (i.e. multifunctional acrylate monomer/oligomer). Conversely, modeling materials (e.g. Vero- Clear™) contain about 30-40% multifunctional acrylic moieties (i.e. crosslinkers) that may help in consolidating the mixing layer.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A water-soluble support material formulation configured to contact a surface of a three-dimensional object during additive manufacturing of said three-dimensional object, the formulation comprising:
   a first hydrophilic monofunctional curable material comprising N-Isopropylacrylamide (NIPAM) present in an amount of 20 to 40% by weight of the total weight of the formulation;
   a second hydrophilic monofunctional curable material comprising N-Hydroxyethyl acrylamide (HEAA) present in an amount of 20% to 40% by weight of the total weight of the formulation;
   at least one water-miscible non-curable material present in an amount of 30 to 50% by weight of the total weight of the formulation; and
   a photoinitiator;
wherein said formulation is photocurable, and devoid of acryloyl morpholine (ACMO) and devoid of a multifunctional curable material; wherein a total amount of said curable materials is 90% or less, by weight, of the total weight of the formulation; wherein a weight ratio of a total weight of said first hydrophilic monofunctional curable material and a total weight of said second hydrophilic monofunctional curable material ranges from 1:5 to 5:1; and wherein said formulation is configured to leave a glossy effect on the surface of said three-dimensional object after curing and removal.

2. The formulation of claim 1, featuring a viscosity of from 8 to 40 centipoises at 75° C.

3. The formulation of claim 1, wherein said additive manufacturing is 3D inkjet printing.

4. The formulation of claim 1, wherein each of said curable materials is a UV-curable material.

5. The formulation of claim 1, further comprising one or more additives.

6. The formulation of claim 5, wherein a total amount of said one or more additives is no more than 3% by weight of the total weight of the formulation.

7. The formulation of claim 1, wherein said at least one water-miscible non-curable material is selected from water, polyols, alkoxylated polyols, polyethylene glycols, polyvinylpyrrolidones, and any combination thereof.

8. The formulation of claim 1, wherein said weight ratio of the total weight of said first hydrophilic monofunctional curable material and the total weight of said second hydrophilic monofunctional curable material ranges from 1:2 to 2:1.

9. The formulation of claim 1, wherein a total amount of said first hydrophilic monofunctional curable material ranges from 20 to 30% by weight of the total weight of the formulation.

10. The formulation of claim 1, wherein a total amount of said second hydrophilic monofunctional curable material ranges from 20 to 30% by weight of the total weight of the formulation.

11. The formulation of claim 1, wherein the first hydrophilic monofunctional curable material is Isopropylacrylamide (NIPAM) and the second hydrophilic monofunctional curable material is N-Hydroxyethyl acrylamide (HEAA).

12. The formulation of claim 1, wherein said water-miscible non-curable material comprises water, present in a range of 1-15% by weight of the total weight of the formulation.

* * * * *